(12) United States Patent
Matsumoto (10) Patent No.: US 12,162,617 B2
(45) Date of Patent: *Dec. 10, 2024

(54) BATTERY CHARGE DIFFERENCE CALCULATION SYSTEM

(71) Applicant: HONDA MOTOR CO., LTD., Tokyo (JP)

(72) Inventor: Takeshi Matsumoto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 22 days.

This patent is subject to a terminal disclaimer.

(21) Appl. No.: 18/105,261

(22) Filed: Feb. 3, 2023

(65) Prior Publication Data

US 2023/0294837 A1 Sep. 21, 2023

(30) Foreign Application Priority Data

Mar. 17, 2022 (JP) .................................. 2022-042324

(51) Int. Cl.
  *B64D 31/18* (2024.01)
  *B64D 27/357* (2024.01)
  (Continued)

(52) U.S. Cl.
  CPC ........... *B64D 31/18* (2024.01); *B64D 27/357* (2024.01); *H02J 7/1415* (2013.01);
  (Continued)

(58) Field of Classification Search
  CPC .... B64D 31/18; B64D 27/357; B64D 35/024; B64D 2221/00; H02J 7/1415; H02J 2310/44
  (Continued)

(56) References Cited

U.S. PATENT DOCUMENTS 11,476,704 B2* 10/2022 Takahashi ............... H02J 9/068
11,845,351 B2* 12/2023 Gurusamy ........ H02J 13/00002
(Continued)

FOREIGN PATENT DOCUMENTS

JP 2000-324871 11/2000

OTHER PUBLICATIONS

Non-Final Office Action for U.S. Appl. No. 18/101,587 dated May 9, 2024.

(Continued)

*Primary Examiner* — Michael R. Fin
(74) *Attorney, Agent, or Firm* — Amin, Turocy & Watson, LLP (57) ABSTRACT

A power supply device includes a power generator, a drive source, a plurality of power supply lines, a plurality of batteries, a difference calculating unit 11, a difference summing unit 12, and an electric power summing unit 13. The difference calculating unit 11 is configured to calculate differences D1, D2, D3, and D4 between a target charge state set for each battery and an estimated charge state. The difference summing unit 12 is configured to sum the differences D1, D2, D3, and D4 calculated by the difference calculating unit 11. The electric power summing unit 13 is configured to sum the charge state calculated by the difference summing unit 12 and electric power used for the electric loads. A control unit 9 controls the drive source such that electric power calculated by the electric power summing unit 13 is generated by the power generator.

2 Claims, 3 Drawing Sheets

(51) Int. Cl.
   *B64D 35/024* (2024.01)
   *H02J 7/14* (2006.01)
(52) U.S. Cl.
   CPC ........ *B64D 35/024* (2024.01); *B64D 2221/00* (2013.01); *H02J 2310/44* (2020.01)
(58) Field of Classification Search
   USPC .......................................................... 307/9.1
   See application file for complete search history.

(56) References Cited

U.S. PATENT DOCUMENTS

| | | | |
|---|---|---|---|
| 2014/0097290 A1* | 4/2014 | Leng | B60L 50/52 |
| | | | 244/6 |
| 2018/0198176 A1* | 7/2018 | Isogai | H01M 10/425 |
| 2023/0294834 A1 | 9/2023 | Matsumoto | |
| 2023/0294837 A1* | 9/2023 | Matsumoto | H02J 7/1415 |
| | | | 244/62 |
| 2023/0299605 A1* | 9/2023 | Eto | B64D 27/357 |
| | | | 307/9.1 |

OTHER PUBLICATIONS

Non-Final Office Action for U.S. Appl. No. 18/115,010 dated May 22, 2024.

* cited by examiner

BATTERY CHARGE DIFFERENCE CALCULATION SYSTEM

CROSS-REFERENCE TO RELATED APPLICATION

Priority is claimed on Japanese Patent Application No. 2022-042324, filed Mar. 17, 2022, the content of which is incorporated herein by reference.

BACKGROUND OF THE INVENTION

Field of the Invention

The present disclosure relates to a power supply device.

Description of Related Art

In the related art, for example, a power supply device including a drive source, a power generator, a plurality of batteries, and a motor that is driven with electric power from the power generator or the batteries in a power supply device of an aircraft or the like is known. In such a power supply device, various techniques for improving battery performance by controlling charging modes of the batteries have been proposed.

For example, Patent Document 1 (Japanese Unexamined Patent Application, First Publication No. 2000-324871) discloses a configuration of a power supply device including a prior battery current command determining unit configured to detect respective charge states of a plurality of batteries and to determine the priority order of supply electric power to the batteries based on the detected respective charge states of the batteries. By preferentially controlling two command values of a current command value of a high-voltage battery out of the plurality of batteries, a current command value of a low-voltage battery, and a torque command value of a torque used for driving a motor, the prior battery current command determining unit subordinately controls the other one.

Accordingly, with the technique described in Patent Document 1, it is possible to achieve equalization of the respective charge states of the batteries and to improve battery performance.

SUMMARY OF THE INVENTION

However, in the technique described in Patent Document 1, distribution proportions of electric power to the batteries are determined based on the respective charge states of the batteries. That is, since it is necessary to calculate electric power used for each battery and to additionally determine the priority order, there is concern about complication in configuration of a control system. Since a device that transmits and receives electric power between the plurality of batteries is needed and a control device is complicated, there is concern about an increase in cost. Since precise control needed for convergence of the respective charge states of the batteries on a predetermined value, control is more complicated. Accordingly, there is concern about complication and an increase in cost of a control device.

Therefore, an objective of the present invention is to provide a power supply device that can curb complication of a control system in comparison with the related art and easily perform control of charging and discharging of a plurality of batteries.

In order to achieve the aforementioned objective, a power supply device according to the present invention employs the following configurations.

(1) According to an aspect of the present invention, a power supply device is provided including: a power generator; a drive source that drives the power generator; a plurality of power supply lines that supply electric power generated by the power generator to a plurality of electric loads; a plurality of batteries that are connected to the corresponding power supply lines upstream from the corresponding electric loads in an electric power supply direction; a diode that is provided upstream from the battery in the corresponding power supply line and allows electric power to flow in only one direction from upstream to downstream of the power supply line; a difference calculating unit configured to calculate a difference between a target charge state set for each battery and an estimated charge state; a difference summing unit configured to sum the differences in charge state of the batteries of the power supply lines calculated by the difference calculating unit; and an electric power summing unit configured to sum the charge state calculated by the difference summing unit and electric power used for the electric loads, wherein the drive source is controlled such that electric power calculated by the electric power summing unit is generated by the power generator.

(2) In the power supply device according to the aspect of (1), the power supply device may be a power supply of an electric propulsion flying object, and the electric loads may be electric motors for causing propellers of the flying object to rotate.

According to the aspect of (1), in each power supply line, electric power generated by the power generator flows in one direction through the diode and is supplied to the corresponding battery. The power supply device includes the difference calculating unit, the difference summing unit, and the electric power summing unit, and the drive source is controlled such that electric power calculated by the electric power summing unit is generated by the power generator. Since the respective charge states of the batteries are controlled based on the sum value of the differences in charge state between the batteries, for example, a control device for managing (controlling) charging and discharging for each battery or the like is not necessary in comparison with the related art in which charging and discharging of batteries is controlled by each battery. Accordingly, it is possible to reduce the cost of the power supply device. As a result, it is possible to easily control charging and discharging of a plurality of batteries with a configuration simpler and cheaper than that in the related art.

Accordingly, it is possible to provide a power supply device that can curb complication of a control system in comparison with the related art and easily perform control of charging and discharging of a plurality of batteries.

Since a battery with a lower charge state is preferentially charged, it is possible to improve an output in a power supply line including a battery with a lower charge state. Since the outputs of the power supply lines are averaged, it is possible to curb a difference in output between the power supply lines. Accordingly, it is possible to implement stable control.

Since a battery with a lower charge state is preferentially charged, it is possible to curb over-discharging of a battery with a lower charge state. Since supply of electric power to a battery with a higher charge state is curbed, it is possible to curb over-charging of a battery with a higher charge state.

Accordingly, it is possible to use a battery in an optimal range of use thereof and to curb deterioration of the battery.

Since supply and reception of electric power between a plurality of batteries are not performed, it is possible to curb complication of a control system in comparison with the related art in which supply and reception of electric power between batteries are performed. By controlling charging and discharging of batteries using only electric power from the power generator without performing supply and reception of electric power between the batteries, it is possible to improve charging/discharging efficiency.

According to the aspect of (2), the power supply device is used as a power supply of an electric propulsion flying object. Here, in a flying object that flies by causing a plurality of propellers to rotate, unevenness in power consumption of the power supply lines is likely to increase, for example, according to the weather or an attitude of the flying object. Accordingly, particularly, when the power supply device is applied to a flying object with a large difference in demanded electric power between electric loads (electric motors) of the power supply lines, the power supply device can be more suitably used. That is, it is possible to accurately supply electric power based on power consumption in the power supply lines including the batteries.

Since electric power from the power generator is distributed according to electric power used for the power supply lines, it is possible to easily control the flying object.

DETAILED DESCRIPTION OF THE INVENTION

Hereinafter, an embodiment of the present invention will be described with reference to the accompanying drawings.
(Flying Object)

Figure 1:
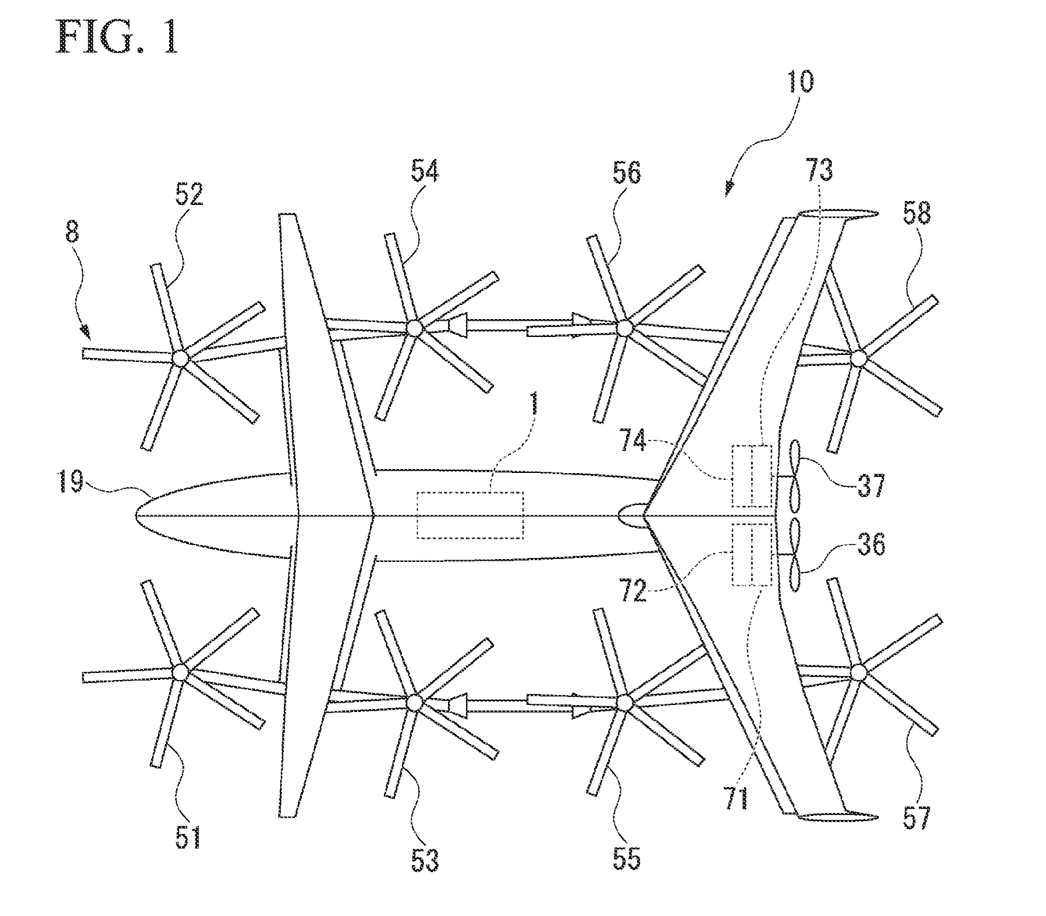
FIG. 1 is a diagram showing appearance of a flying object in which a power supply device according to an embodiment is mounted.

FIG. 1 is a diagram showing appearance of a flying object 10 in which a power supply device 1 according to an embodiment is mounted.

The flying object 10 is, for example, an electric propulsion aircraft that flies by rotating a plurality of propellers 8. The flying object 10 includes an airframe 19 and a power supply device 1.

In this embodiment, eight propellers (rotors) 51, 52, 53, 54, 55, 56, 57, and 58 facing downward and two propulsion propellers 36 and 37 facing rearward are attached to the airframe 19. In the following description, the plurality of propellers 51, 52, 53, 54, 55, 56, 57, and 58 may be referred to as propellers 8 when they are not distinguished from each other.

Each propeller 8 is attached to the airframe 19 via an attachment member which is not shown. An electric motor 7 (see FIG. 2) is attached to a base (a rotation shaft) of the propeller 8. The electric motor 7 drives the propeller 8. The electric motor 7 is, for example, a brushless DC motor. Each propeller 8 is a fixed wing with blades rotating around an axis parallel to the gravitational direction when the flying object 10 takes a horizontal attitude.

The propulsion propellers 36 and 37 are attached to the rear of the flying object 10. The propulsion propellers 36 and 37 are attached to the airframe 19 via attachment members which are not shown. Electric motors 7 (see FIG. 2) that drive the propulsion propellers 36 and 37 are attached to bases (rotation shafts) of the propulsion propellers 36 and 37. The propulsion propellers 36 and 37 are fixed wings with blades rotating around an axis crossing the gravitational direction (for example, an axis parallel to a longitudinal direction of the flying object 10) when the flying object 10 takes a horizontal attitude.

By causing the propellers 8 and the propulsion propellers 36 and 37 to rotate according to a control signal, the flying object 10 flies in a desired flight state. The control signal is a signal for controlling the flying object 10 based on an operator's operation or an instruction in automatic driving. For example, when the propellers 51, 54, 55, 58 rotate in a first direction (for example, a clockwise direction) and the propellers 52, 53, 56, and 57 rotate in a second direction (for example, a counterclockwise direction), the flying object 10 flies.

Figure 2:
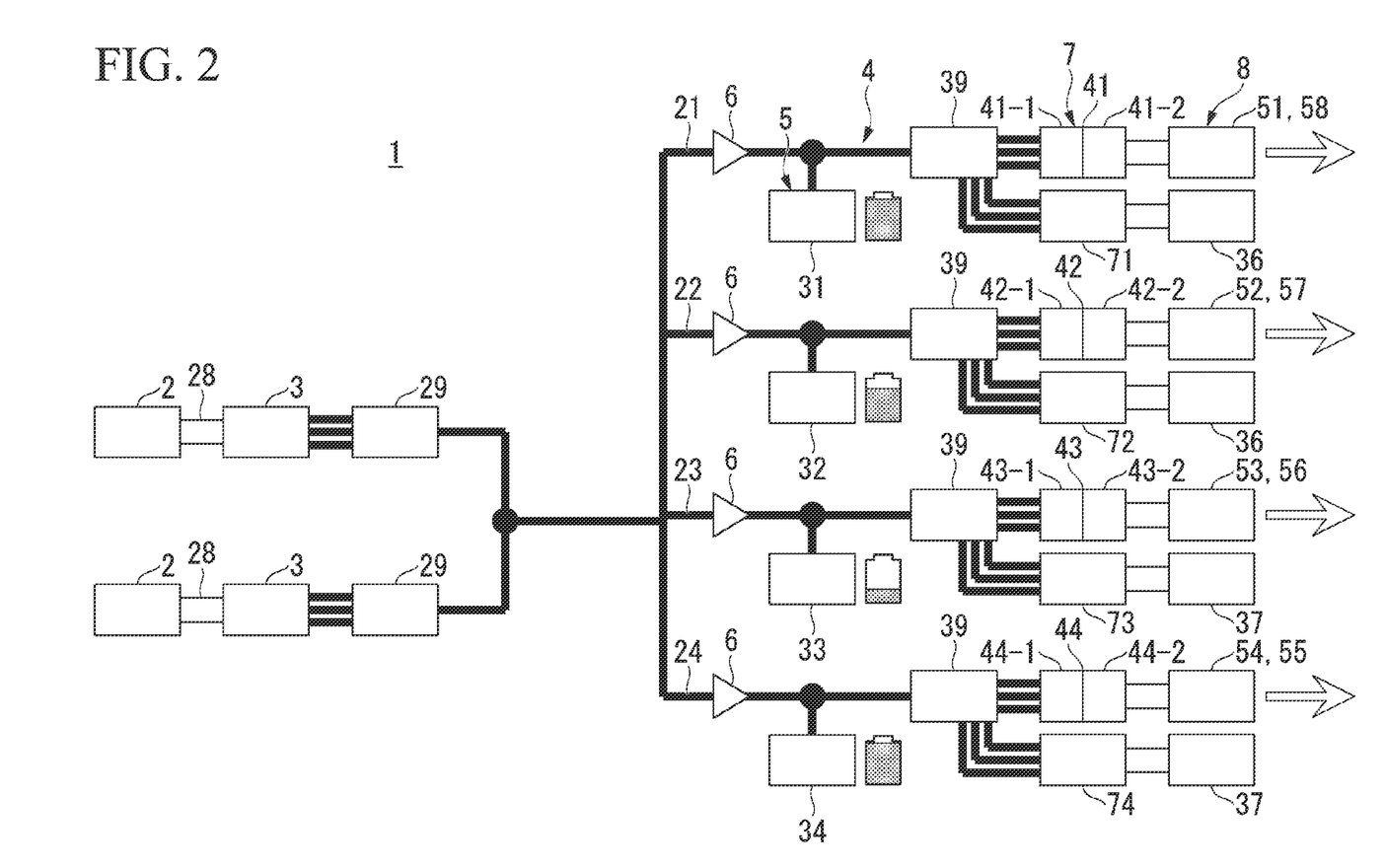
FIG. 2 is a diagram schematically showing a configuration of the power supply device according to the embodiment.

FIG. 2 is a diagram schematically showing a configuration of the power supply device 1 according to the embodiment.

As shown in FIG. 2, the power supply device 1 is mounted in the aforementioned flying object 10. The power supply device 1 is used as a power supply of the flying object 10. The power supply device 1 includes a drive source 2, a power generator 3, a plurality of power supply lines 4, a plurality of batteries 5, a diode 6, an electric motor 7 (an electric load in the claims), the propellers 8, and a control unit 9 (see FIG. 3).
(Drive Source)

The drive source 2 is a so-called gas turbine engine. A plurality of (two in this embodiment) drive sources 2 are provided. Since the two drive sources 2 have the same configuration, one drive source 2 will be exemplified in the following description. The drive source 2 includes a compressor, a turbine, and a rotation shaft that connects the compressor and the turbine (all of which are not shown). The compressor compresses intake air taken via an intake port (not shown) provided in the airframe of the flying object 10. The turbine is connected to the compressor and rotates along with the compressor. A starter motor is connected to the drive source 2. When the drive source 2 starts, the starter motor is first driven with electric power from the batteries 5 which will be described later. Accordingly, the drive source 2 starts with a rotational force transmitted from the starter motor.
(Power Generator)

A number of (two in this embodiment) power generators 3 corresponding to the number of drive sources 2. Since the two power generators 3 have the same configuration, one power generator 3 will be exemplified in the following description. The power generator 3 is connected to the drive source 2 via a transmission shaft 28 and a reduction gear mechanism (not shown). The power generator 3 is disposed on the turbine side in an axial direction of the drive source 2. The power generator 3 is provided on the same axis as the drive source 2. The power generator 3 generates electric power (AC electric power) with driving of the drive source 2. The AC electric power generated by the power generator 3 is converted to DC electric power by a converter 29 of a power drive unit (PDU) which is not shown and is stored in the batteries 5 via the power supply lines 4.

(Power Supply Line)

The power supply lines 4 are connected to the plurality of power generators 3 via the converter 29. The power supply lines 4 supply electric power generated by the power generator 3 to a plurality of electric motors 7 (electric loads). A plurality of (four in this embodiment) power supply lines 4 are provided. Electric power generated by the power generators 3 is combined once and then is distributed and supplied to the four power supply lines 21, 22, 23, and 24 at predetermined proportions in accordance with a signal from the control unit 9 (see FIG. 3). Specifically, electric power generated by the power generator 3 is preferentially supplied to the battery 5 with a lower charge state out of the batteries 5 provided in the power supply lines 4. For example, by connecting the batteries 5 and the diodes 6, the battery 5 with a lower charge state is preferentially (more) supplied with electric power. The power supply lines 4 include a first power supply line 21, a second power supply line 22, a third power supply line 23, and a fourth power supply line 24. The diode 6, the electric motor 7, and predetermined propellers 8 are connected to each power supply line 4.

The first power supply line 21 is used as the power supply line 4 for driving the first propeller 51 and the eighth propeller 58 of the eight propellers 8 and the propulsion propeller 36. In other words, the first propeller 51, the eighth propeller 58, and the propulsion propeller 36 are driven with electric power supplied to the first power supply line 21.

The second power supply line 22 is used as the power supply line 4 for driving the second propeller 52 and the seventh propeller 57 of the eight propellers 8 and the propulsion propeller 36. In other words, the second propeller 52, the seventh propeller 57, and the propulsion propeller 36 are driven with electric power supplied to the second power supply line 22.

The third power supply line 23 is used as the power supply line 4 for driving the third propeller 53 and the sixth propeller 56 of the eight propellers 8 and the propulsion propeller 37. In other words, the third propeller 53, the sixth propeller 56, and the propulsion propeller 37 are driven with electric power supplied to the third power supply line 23.

The fourth power supply line 24 is used as the power supply line 4 for driving the fourth propeller 54 and the fifth propeller 55 of the eight propellers 8 and the propulsion propeller 37. In other words, the fourth propeller 54, the fifth propeller 55, and the propulsion propeller 37 are driven with electric power supplied to the fourth power supply line 24.

(Battery)

The battery 5 is provided for each power supply line 4. A plurality of (four in this embodiment) batteries 5 are provided. Specifically, the batteries 5 include a first battery 31, a second battery 32, a third battery 33, and a fourth battery 34. The first battery 31 is provided in the first power supply line 21. The second battery 32 is provided in the second power supply line 22. The third battery 33 is provided in the third power supply line 23. The fourth battery 34 is provided in the fourth power supply line 24. Each battery 5 is provided upstream from the corresponding electric motor 7 in an electric power supply direction. The batteries 5 have the same capacity and the same configuration. Since demanded electric power or power consumption varies depending on the power supply lines 4, the charge state and the power consumption of each battery 5 are not constant.

(Diode)

The diode 6 is provided for each power supply line 4. That is, a plurality of (four in this embodiment) diodes 6 are provided. Each diode 6 is provided upstream from the corresponding battery 5 in the electric power supply direction in the corresponding power supply line 4. The diode 6 uses electric power of the battery 5 provided in the corresponding power supply line 4. That is, when the voltage of a battery 5 decreases, a voltage of the diode 6 provided in the same power supply line 4 as the battery 5 also decreases. Accordingly, the power supply line 4 including the diode 6 with a lower voltage is preferentially supplied with electric power from the power generator. Basically, the diode 6 allows electric power to flow in only one direction from upstream to downstream of the corresponding power supply line 4. In other words, the diode 6 cuts off a reverser flow of electric power from the battery 5. Accordingly, in a state in which electric power is being generated by the power generator 3, supply and reception of electric power between the plurality of batteries 5 are not performed.

On the other hand, the diode 6 allows electric power to flow from downstream to upstream of the corresponding power supply line 4 in accordance with a control signal when the drive source 2 starts. Accordingly, it is possible to drive the starter motor connected to the drive source 2 using electric power from the battery 5.

(Electric Motor)

The electric motor 7 is provided for each of the power supply line 4. The electric motor 7 is connected to the corresponding battery 5 via an inverter 39. Specifically, the first electric motors 41 (More specifically, the first electric motors 41-1 and 41-2) are provided in the first power supply line 21. The second electric motors 42 (More specifically, the second electric motors 42-1 and 42-2) are provided in the second power supply line 22. The third electric motors 43 (More specifically, the third electric motors 43-1 and 43-2) are provided in the third power supply line 23. The fourth electric motors 44 (More specifically, the fourth electric motors 44-1 and 44-2) are provided in the fourth power supply line 24. Thus, in this embodiment, each power supply line 4 has two electric motors 7. Each electric motor 7 is provided downstream from the corresponding battery 5 in the electric power supply direction. Each electric motor 7 causes the propellers 8 of the flying object 10 to rotate using electric power of at least one of electric power from the power generator 3 and electric power from the battery 5. The electric motors 7 have the same configuration.

The electric motors 7 further include four propulsion electric motors 71, 72, 73, and 74. The propulsion electric motor 71 is provided in the first power supply line 21. The propulsion electric motor 72 is provided in the second power supply line 22. The propulsion electric motor 73 is provided in the third power supply line 23. The propulsion electric motor 74 is provided in the fourth power supply line 24. The propulsion electric motors 71 and 72 cause the propulsion propeller 36 to rotate. The propulsion electric motors 73 and 74 cause the propulsion propeller 37 to rotate.

(Propeller)

The propellers 8 are connected to the predetermined electric motors 7. The propellers 8 are driven with electric power from the predetermined power supply lines 4.

As described above, the first propeller 51 and the eighth propeller 58 are connected to the first electric motor 41 and rotate around a rotation axis with driving of the first electric motor 41. Specifically, the first propeller 51 is connected to the first electric motor 41-1 and the eighth propeller 58 is connected to the first electric motor 41-2. The second propeller 52 and the seventh propeller 57 are connected to the second electric motor 42 and rotate around a rotation axis with driving of the second electric motor 42. Specifically, the second propeller 52 is connected to the second electric motor 42-1 and the seventh propeller 57 is connected to the second electric motor 42-2. The third propeller 53 and the sixth propeller 56 are connected to the third electric motor 43 and rotate around a rotation axis with driving of the third electric motor 43. Specifically, the third propeller 53 is connected to the third electric motor 43-1 and the sixth propeller 56 is connected to the third electric motor 43-2. The fourth propeller 54 and the fifth propeller 55 are connected to the fourth electric motor 44 and rotate around a rotation axis with driving of the fourth electric motor 44. Specifically, the fourth propeller 54 is connected to the fourth electric motor 44-1 and the fifth propeller 55 is connected to the fourth electric motor 44-2.

The propulsion propeller 36 is connected to the propulsion electric motors 71 and 72. The propulsion propeller 36 rotates with driving of the propulsion electric motors 71 and 72 to generate a propulsion force in the horizontal direction.

The propulsion propeller 37 is connected to the propulsion electric motors 73 and 74. The propulsion propeller 37 rotates with driving of the propulsion electric motors 73 and 74 to generate a propulsion force in the horizontal direction.

(Control Unit)

Figure 3:
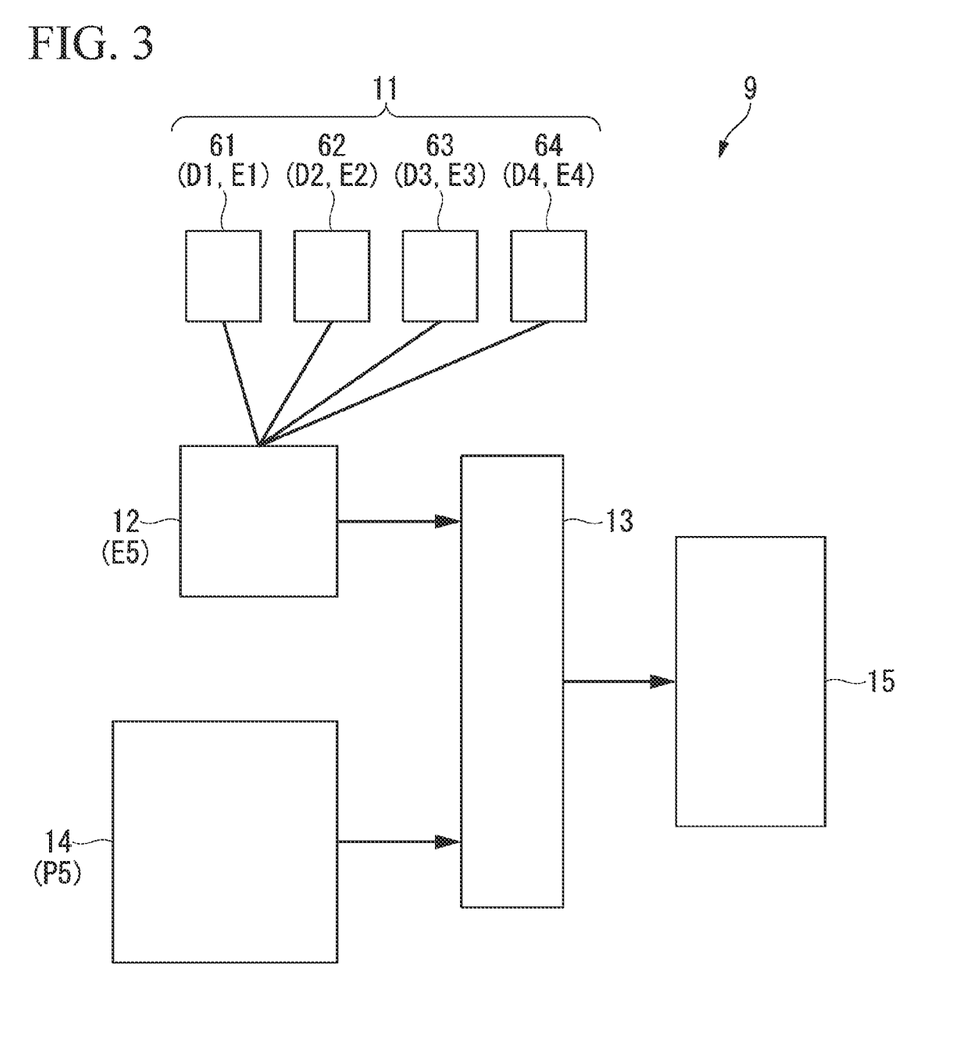
FIG. 3 is a block diagram showing control blocks of the power supply device according to the embodiment.

FIG. 3 is a block diagram showing control blocks of the power supply device 1 according to the embodiment.

The control unit 9 controls electric power generated by the power generator 3 by controlling an output of the gas turbine engine. In the following description, control when electric power generated by the power generator 3 is determined based on demanded electric power or respective charge states of the batteries 5, or the like in response to an output request for the electric motors 7 (the propellers 8) will be described. The control unit 9 may also perform various types of control, for example, when power generation by the power generator 3 is not performed, when the flying object 10 is landing, taking off, or cruising, or the like.

As shown in FIG. 3, the control unit 9 includes a difference calculating unit 11, a difference summing unit 12, a demanded electric power output unit 14, an electric power summing unit 13, and a power generator ECU 15.

The difference calculating unit 11 calculates a difference between a target charge state set for each battery 5 and an estimated charge state, converts the calculated difference in charge state to an electric power value, and outputs the electric power value. The target charge state is a value which is preset based on a flight plan, rated values of the batteries 5, or the like and is set to, for example, "75% of a substantially available capacity of a battery 5." The target charge state may be a value with a width of a predetermined range. For example, the target charge state may be set to "75% to 80% of an available capacity." The estimated charge state (hereinafter referred to as an estimated charge state) is, for example, a value which is uniquely determined (estimated) from a voltage of battery terminals by measuring the voltage of the battery terminals.

For example, a so-called Coulomb count method (a current integration method) of estimating a charge state of a battery 5 based on an integrated value of a charging/discharging current of the battery 5 may be used as the method of estimating the charge state of the battery 5.

The difference calculating unit 11 includes a first difference calculating unit 61, a second difference calculating unit 62, a third difference calculating unit 63, and a fourth difference calculating unit 64.

The first difference calculating unit 61 calculates a first difference D1 which is a difference between a first target charge state T1 which is a target charge state set for the first battery 31 and a first estimated charge state SOC1 which is an estimated charge state of the first battery 31 (D1=T1−SOC1). The first difference D1 is a value equal to or greater than zero. For example, when the first estimated charge state SOC1 is greater than the first target charge state T1, the first difference D1 may be set to zero. The first difference calculating unit 61 calculates first feedback (FB) electric power E1 by converting the charge state to an electric power value based on the first difference D1. The first difference calculating unit 61 outputs the first FB electric power E1 to the difference summing unit 12 which will be described later.

The second difference calculating unit 62 calculates a second difference D2 which is a difference between a second target charge state T2 which is a target charge state set for the second battery 32 and a second estimated charge state SOC2 which is an estimated charge state of the second battery 32 (D2=T2−SOC2). Similarly to the first difference D1, the second difference D2 is a value equal to or greater than zero. The second difference calculating unit 62 calculates second FB electric power E2 by converting the charge state to an electric power value based on the second difference D2. The second difference calculating unit 62 outputs the second FB electric power E2 to the difference summing unit 12.

The third difference calculating unit 63 calculates a third difference D3 which is a difference between a third target charge state T3 which is a target charge state set for the third battery 33 and a third estimated charge state SOC3 which is an estimated charge state of the third battery 33 (D3=T3−SOC3). Similarly to the first difference D1, the third difference D3 is a value equal to or greater than zero. The third difference calculating unit 63 calculates third FB electric power E3 by converting the charge state to an electric power value based on the third difference D3. The third difference calculating unit 63 outputs the third FB electric power E3 to the difference summing unit 12.

The fourth difference calculating unit 64 calculates a fourth difference D4 which is a difference between a fourth target charge state T4 which is a target charge state set for the fourth battery 34 and a fourth estimated charge state SOC4 which is an estimated charge state of the fourth battery 34 (D4=T4−SOC4). Similarly to the first difference D1, the fourth difference D4 is a value equal to or greater than zero. The fourth difference calculating unit 64 calculates fourth FB electric power E4 by converting the charge state to an electric power value based on the fourth difference D4. The fourth difference calculating unit 64 outputs the fourth FB electric power E4 to the difference summing unit 12.

The target respective charge states T1, T2, T3, and T4 are output from a flight control unit which is not shown to the corresponding difference calculating units 11. The target respective charge states T1, T2, T3, and T4 are values set for the batteries 5. Accordingly, the target respective charge states T1, T2, T3, and T4 may be different values or the same value.

The difference summing unit 12 calculates an electric power difference sum E5 by summing the FB electric power based on the differences in charge state of the battery between the power supply lines 4 calculated by the difference calculating unit 11. The difference summing unit 12 calculates the electric power difference sum E5 by summing the values of the first FB electric power E1, the second FB electric power E2, the third FB electric power E3, and the fourth FB electric power E4 (E5=E1+E2+E3+E4).

The demanded electric power output unit 14 detects demanded electric power from the airframe 19 and outputs the received demanded electric power to the electric power summing unit 13 which will be described later. The demanded electric power of the airframe 19 is a sum of the demanded electric power for the electric motors 7 of the power supply lines 4. Specifically, the demanded electric power output unit 14 detects first demanded electric power P1 which is the demanded electric power for the first electric motor 41 of the first power supply line 21, second demanded electric power P2 which is the demanded electric power for the second electric motor 42 of the second power supply line 22, third demanded electric power P3 which is the demanded electric power for the third electric motor 43 of the third power supply line 23, and fourth demanded electric power P4 which is the demanded electric power for the fourth electric motor 44 of the fourth power supply line 24. The demanded electric power output unit 14 calculates a demanded electric power sum P5 as the demanded electric power of the airframe 19 by summing the detected demanded electric power P1, P2, P3, and P4 (P5=P1+P2+P3+P4).

The electric power summing unit 13 sums the electric power difference sum E5 calculated by the difference summing unit 12 and the demanded electric power sum P5 which is the demanded electric power from the electric motors 7 and which is calculated by the demanded electric power output unit 14. The electric power summing unit 13 sets electric power obtained by summing the electric power difference sum E5 and the demanded electric power sum P5 as target electric power to be generated.

The power generator ECU 15 controls electric power generated by the power generator 3 by controlling driving of the drive source 2. The target electric power to be generated calculated by the electric power summing unit 13 is input to the power generator ECU 15. The power generator ECU 15 controls the drive source 2 such that the power generator 3 generates the target electric power to be generated calculated by the electric power summing unit 13.

A part of electric power generated by the power generator 3 is supplied to the power supply lines 4 according to demanded electric power for the electric motors 7. The other part of electric power generated by the power generator 3 is distributed to the power supply lines 4 and is charged in the batteries 5 such that a battery 5 with a lower charge state is preferentially (more) charged. An amount of electric power to be supplied to a battery 5 of which the estimated charge state reaches the target charge state already is set to zero. Accordingly, it is possible to recover or maintain the respective charge states of the batteries 5 while meeting demanded outputs.

(Operations and Advantages)

Operations and advantages of the power supply device 1 will be described below.

With the power supply device 1 according to this embodiment, in each power supply line 4, electric power generated by the power generator 3 flows in one direction through the diode 6 and is supplied to the batteries 5. The power supply device 1 includes the difference calculating unit 11, the difference summing unit 12, and the electric power summing unit 13, and the drive source 2 is controlled such that electric power calculated by the electric power summing unit 13 is generated by the power generator 3. Since the respective charge states of the batteries 5 are controlled based on the sum value of the differences in charge state between the corresponding batteries 5, for example, a control device for managing (controlling) charging and discharging for each battery 5 or the like is not necessary in comparison with the related art in which charging and discharging of batteries 5 is controlled by each battery. Accordingly, it is possible to reduce the cost of the power supply device 1. As a result, it is possible to easily control charging and discharging of a plurality of batteries 5 with a configuration simpler and cheaper than that in the related art.

Accordingly, it is possible to provide a power supply device 1 that can curb complication of a control system in comparison with the related art and easily perform control of charging and discharging of a plurality of batteries 5.

Since a battery 5 with a lower charge state is preferentially charged, it is possible to improve an output in a power supply line 4 including a battery 5 with a lower charge state. Since the outputs of the power supply lines 4 are averaged, it is possible to curb a difference in output between the power supply lines 4. Accordingly, it is possible to implement stable control.

Since a battery 5 with a lower charge state is preferentially charged, it is possible to curb over-discharging of a battery 5 with a lower charge state. Since supply of electric power to a battery 5 with a higher charge state is curbed, it is possible to curb over-charging of a battery 5 with a higher charge state. Accordingly, it is possible to use a battery 5 in an optimal range of use thereof and to curb deterioration of the battery 5.

Since supply and reception of electric power between a plurality of batteries 5 are not performed, it is possible to curb complication of a control system in comparison with the related art in which supply and reception of electric power between batteries 5 are performed. By controlling charging and discharging of the batteries 5 using only electric power from the power generator 3 without performing supply and reception of electric power between the batteries 5, it is possible to improve charging/discharging efficiency.

The power supply device 1 is used as a power supply of the electric propulsion flying object 10. An electric load is the electric motors 7 causing the propellers 8 of the flying object 10 to rotate. Here, in the flying object 10 that flies by causing a plurality of propellers 8 to rotate, unevenness in power consumption of the power supply lines 4 is likely to increase, for example, according to the weather or an attitude of the flying object 10. Accordingly, particularly, when the power supply device 1 is applied to a flying object 10 with a large difference in demanded electric power between the electric loads (the electric motors 7) of the power supply lines 4, the power supply device 1 can be more suitably used. That is, it is possible to accurately supply electric power based on power consumption in the power supply lines 4 including the batteries 5.

Since electric power from the power generator 3 is distributed according to electric power used for the power supply lines 4, it is possible to easily control the flying object 10.

The technical scope of the present invention is not limited to the aforementioned embodiment and the embodiment can be modified in various forms without departing from the gist of the present invention.

In the aforementioned embodiment, a configuration in which four power supply lines 4 are connected to two power generators 3 has been described above, but the present invention is not limited thereto. For example, two power supply lines 4 may be connected to one power generator 3. That is, the first power supply line 21 and the second power supply line 22 may be connected to one power generator 3 out of two power generators 3, and the third power supply line 23 and the fourth power supply line 24 may be connected to the other power generator 3 thereof. In this case, the first power supply line 21 and the second power supply line 22 may be independent from the third power supply line 23 and the fourth power supply line 24.

The number of power generators 3 or the number of drive sources 2 is not limited to two. Similarly, the number of propellers 8 is not limited to eight. Combinations of the propellers 8 and the power supply lines 4 are not limited to the aforementioned embodiment.

The electric power summing unit 13 may set a value obtained by adding a predetermined amount to a value obtained by summing the electric power difference sum E5 and the demanded electric power sum P5, for example, in consideration of a loss, as final target electric power to be generated. The electric power summing unit 13 may output the final target electric power to be generated to the power generator ECU 15.

After the difference sum D5 obtained by summing all the differences D1, D2, D3, and D4 is calculated, the electric power difference sum E5 may be calculated by converting the difference sum D5.

In this embodiment, the demanded electric power of the airframe 19 was calculated by summing the respective demanded electric power for the first through fourth electric motors 41, 42, 43, and 44, but is not limited to this. For example, the demanded electric power of the airframe 19 may be calculated by adding the sum of the demanded electric power for the four propulsion electric motors 71, 72, 73, and 74 in addition to the sum of the demanded electric power for the first through fourth electric motors 41, 42, 43, 44.

Without departing from the gist of the present invention, elements in the aforementioned embodiment can be appropriately replaced with known elements, and the aforementioned embodiments may be appropriately combined.

EXPLANATION OF REFERENCES

1 Power supply device
2 Drive source
3 Power generator
4 Power supply line
5 Battery
6 Diode
7 Electric motor (electric load)
8 Propeller
10 Flying object
11 Difference calculating unit
12 Difference summing unit
13 Electric power summing unit
SOC1 First estimated charge state (estimated charge state)
SOC2 Second estimated charge state (estimated charge state)
SOC3 Third estimated charge state (estimated charge state)
SOC4 Fourth estimated charge state (estimated charge state)
T1 First target charge state (target charge state)
T2 Second target charge state (target charge state)
T3 Third target charge state (target charge state)
T4 Fourth target charge state (target charge state)

What is claimed is:

1. A power supply device comprising:
a power generator;
a drive source that drives the power generator;
a plurality of power supply lines that supply electric power generated by the power generator to a plurality of electric loads;
a plurality of batteries that are connected to the corresponding power supply lines upstream from the corresponding electric loads in an electric power supply direction;
a diode that is provided upstream from the battery in the corresponding power supply line and allows electric power to flow in only one direction from upstream to downstream of the power supply line;
a difference calculating unit configured to calculate a difference between a target charge state set for each battery and an estimated charge state;
a difference summing unit configured to sum the differences in charge state of the batteries of the power supply lines calculated by the difference calculating unit; and
an electric power summing unit configured to sum the charge state calculated by the difference summing unit and electric power used for the electric loads,
wherein the drive source is controlled such that electric power calculated by the electric power summing unit is generated by the power generator.

2. The power supply device according to claim 1, wherein the power supply device is a power supply of an electric propulsion flying object, and
wherein the electric loads are electric motors for causing propellers of the flying object to rotate.

* * * * *